United States Patent [19]

Stone

[11] Patent Number: 5,178,920
[45] Date of Patent: Jan. 12, 1993

[54] MOTOR VEHICLE HOOD ORNAMENT MOUNT

[75] Inventor: William J. Stone, Thornwood, N.Y.

[73] Assignee: Bettre Environ Ltd., Thornwood, N.Y.

[21] Appl. No.: 747,793

[22] Filed: Aug. 19, 1991

[51] Int. Cl.⁵ .............................................. B60R 13/04
[52] U.S. Cl. ...................................... 428/31; 40/591; 280/727
[58] Field of Search .......................... 428/31; 280/727; 40/591

[56] References Cited

U.S. PATENT DOCUMENTS 4,788,550 11/1988 Chadima, Jr. .................... 428/31 X
4,913,941 4/1990 Tedrahn .......................... 280/727 X
5,002,810 3/1991 Birdwell et al. ...................... 428/30

Primary Examiner—Henry F. Epstein
Attorney, Agent, or Firm—Kane, Dalsimer, Sullivan, Kurucz, Levy, Eisele and Richard

[57] ABSTRACT

A motor vehicle hood ornament mount is disclosed. Designed with the goal of discouraging theft or vandalism of the ornament displayed thereon, the device includes a spring biasing means which normally forces the displayed ornament into the preferred orientation, yet when disturbed by some destructive individual prevents the ready application of a dislodging force. The ornament resides within an ornament holder housed within a mounting shell attached through the body of the vehicle, and a biasing spring forces ornament holder in an external direction.

15 Claims, 4 Drawing Sheets

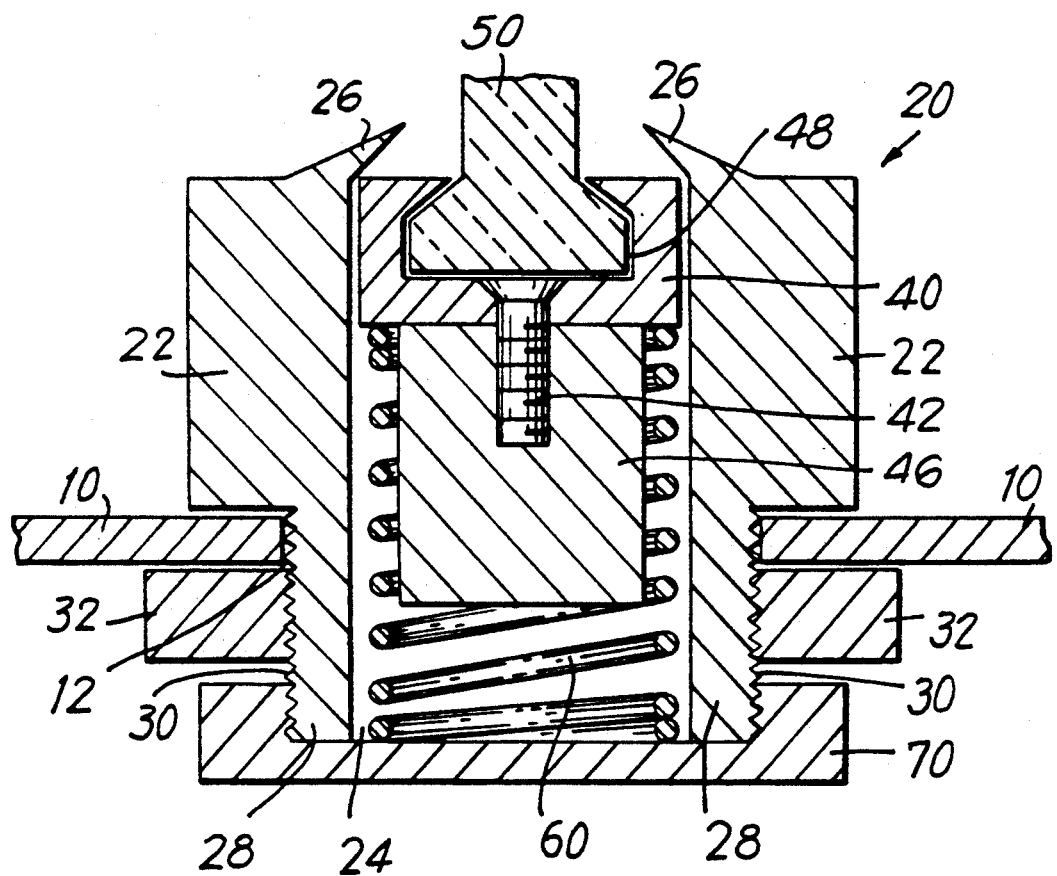

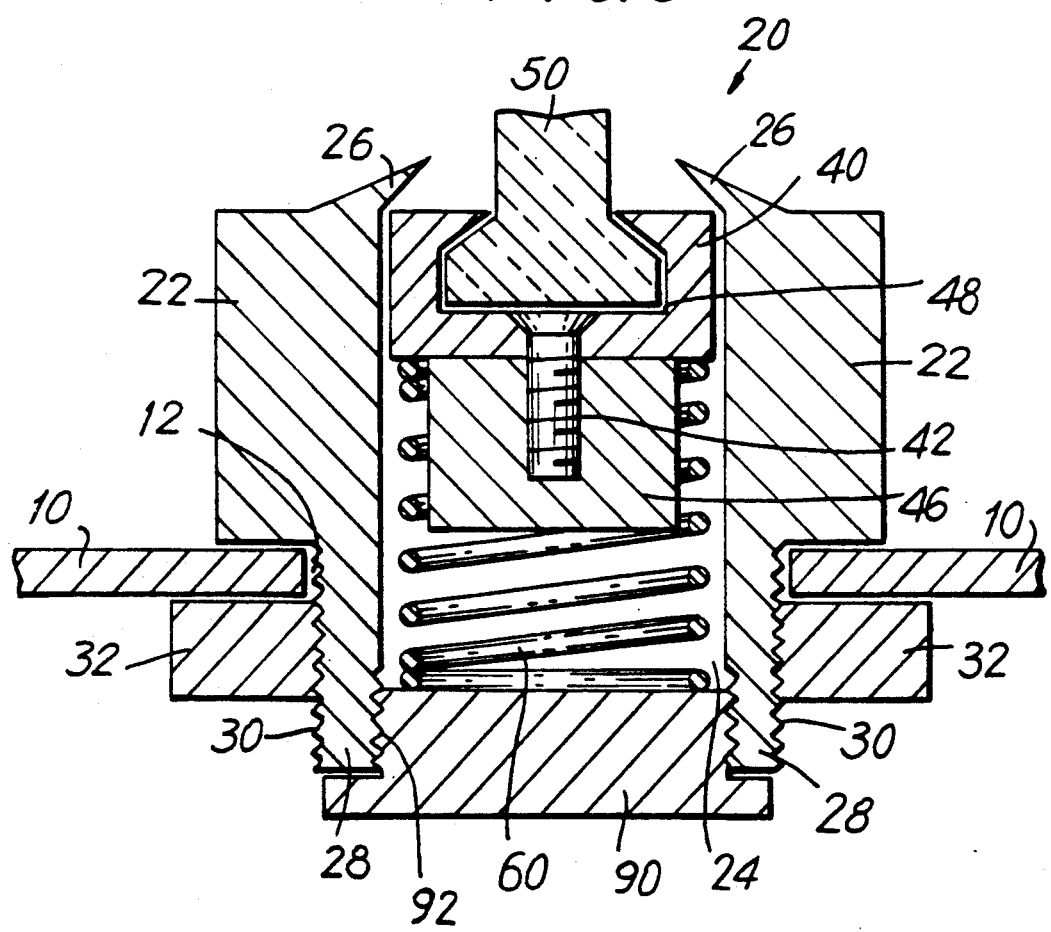

MOTOR VEHICLE HOOD ORNAMENT MOUNT

BACKGROUND OF THE INVENTION

1. Field of the Invention

The present invention relates to decorative hood ornaments commonly provided on automobiles, trucks, and other motor vehicles. Specifically, the invention is a hood ornament mount designed to inhibit or discourage the theft of the ornament displayed thereon.

2. Description of the Prior Art

Motor vehicle hood ornaments are widely known in the art. While they may indeed enhance the aesthetic appearance of an automobile, truck, or other motor vehicle, it is an unfortunate consequence of the prominence with which they are displayed that they are frequently made the target of theft or vandalism. On city streets, it is commonplace to observe the overall pleasing appearance of a late-model automobile marred by the disappearance of what can be considered one of its finishing touches, the hood ornament.

The present invention is designed to remedy this shortcoming in the hood ornaments, and particularly in the mounts thereof, of the prior art.

SUMMARY OF THE INVENTION

The present invention is a motor vehicle hood ornament mount designed to inhibit, discourage, or, at the very least, render more difficult the theft of the ornament displayed thereon.

Essentially, in the present invention, the hood ornament is mounted in an ornament holder, which is disposed within a mounting shell having a cylindrical bore. At the upper end of this cylindrical bore is a substantially inward flange, which prevents the ornament holder, which may itself be mounted atop a shaft, from exiting the cylindrical bore.

The lower portion of the mounting shell is characterized by a cylindrical section of smaller outer diameter than the width dimension of the upper portion of the mounting shell. The external surface of this cylindrical section is threaded to accommodate a nut for securing the mounting shell in a circular hole in the hood of a motor vehicle. Specifically, the lower cylindrical portion of the mounting shell is passed through a hole of slightly larger diameter in the motor vehicle hood, where, from the underside, it is fixedly secured by the above-noted nut. A washer may be disposed about the lower cylindrical portion of the mounting shell in advance of the nut, if desired. An epoxy sealant or glue may be applied to the threads of the cylindrical portion of the mounting shell prior to screwing on the nut. In such a case, the nut, when tightened against the underside of the hood, will be more difficult to remove.

The ornament and its holder, which, as noted above, may be disposed atop a shaft within the cylindrical bore of the mounting shell, are biased toward the upper end of the cylindrical bore by a cylindrical biasing spring. The shaft, when provided, is preferably cylindrical and of diameter sufficiently less than that of a cylindrical bore to permit the deployment thereabout of the cylindrical biasing spring. The biasing action of this spring forces the ornament and its holder up against the flange at the top of the cylindrical bore of the mounting shell.

At the lower end of the cylindrical bore there may be a nut-like end cap. The nut-like end cap, too, is threaded and of a diameter such that it can be screwed on to the lower cylindrical portion of the mounting shell. As before, an epoxy sealant or glue may be applied to the threads of this cylindrical portion prior to screwing on the nut-like end cap, in order to render it difficult to remove the end cap at a later time.

Before closing the end cap, however, the cylindrical biasing spring is inserted within the cylindrical bore, and about the shaft, if one is used. The spring is of a length and stiffness such that the ornament and its holder will be biased upward when the end cap is fully secured.

Alternate means may be used to retain the biasing spring within the cylindrical bore. In one such means, the biasing spring stands upon a cylindrical disc or washer, which itself is retained within the cylindrical bore by a retaining pin deployed diametrically across the bottom of the lower cylindrical portion of the mounting shell. The nut which secures the hood ornament mount to the hood of the motor vehicle prevents the retaining pin from slipping out of its proper position. A cotter pin, inserted across the bottom of the lower cylindrical portion of the mounting shell after the nut has secured the mounting shell to the hood of the motor vehicle, may also be used to retain the cylindrical disc or washer within the cylindrical bore.

In another such means, the cylindrical bore is threaded to accommodate a bolt or screw which retains the biasing spring therewithin.

To its credit, the present invention renders it more difficult to steal or damage the hood ornament, because the ornament is not rigidly fixed in position. Rather, its holder will move within the cylindrical bore of the mounting shell atop the shaft, thereby preventing the effective application of forces which would otherwise remove it.

The present invention will be more particularly described with reference to the figures which are catalogued below.

BRIEF DESCRIPTION OF THE DRAWINGS

FIG. 1 is a cross-sectional view of a first embodiment of the motor vehicle hood ornament mount of the present invention.

FIG. 3 is a cross-sectional view of a third embodiment of the motor vehicle hood ornament mount of the present invention.

DETAILED DESCRIPTION OF THE PREFERRED EMBODIMENT

Figure 2A:
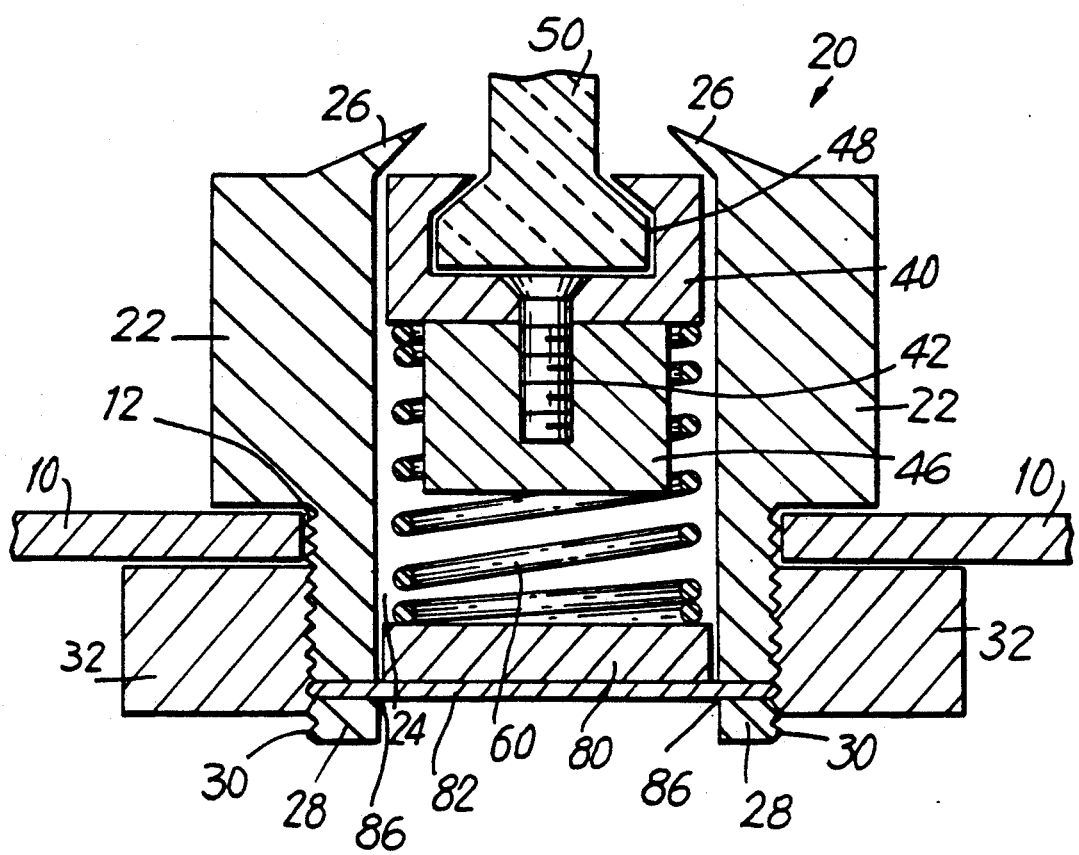
FIG. 2a is a cross-sectional view of a second embodiment of the motor vehicle hood ornament mount of the present invention.

With reference to FIG. 1, which shows a first embodiment of the motor vehicle hood ornament mount 20 of the present invention in cross section, the body 10 of the motor vehicle, most likely of sheet steel, has a hole 12 drilled therethrough to accommodate the device.

The hood ornament mount 20 includes a mounting shell 22 having a substantially cylindrical bore 24. At one end of the bore, to be precise, the end adjacent to the external surface of the body 10 of the motor vehicle, is a substantially inward flange 26.

The mounting shell 22 has a cylindrical portion 28 which extends through the hole 12 in the body 10 of the motor vehicle. The diameter of this cylindrical portion 28 is less than the width of that portion of the mounting shell 22 not extending through the hole 12. The external surface of cylindrical portion 28 has threads 30 so that nut 32 may be used to attach the mounting shell 22 securely to the body 10. Epoxy sealant or glue may be applied to the threads 30 before screwing on nut 32 to further seal the attachment.

Within the cylindrical bore 24 is an ornament holder 40 connected by a screw means 42 to a shaft 46. Other means for attaching the ornament holder 40 to the shaft 46 may be employed by those skilled in the art with equally good result.

Ornament holder 40 has a diameter slightly less than that of the cylindrical bore 24 so that it may be axially translatable therewithin yet be prevented from exiting past the inward flange 26. Ornament holder 40 further has a receptacle 48 into which an ornament 50 may be fixedly secured. For the purposes of illustration, the ornament 50 is shown in part to be of a transparent material. In practice, it may be of a transparent glass or plastic, as well as a gem or mineral, medallion or insignia, figurine, statue, or the like.

The ornament holder 40 is biased toward the inward flange 26 of the mounting shell 22. The biasing is accomplished by means of a spring 60, which is disposed about the shaft 46. Preferably, the shaft 46 is of somewhat smaller diameter than the ornament holder 40 so that the spring 60 will reside between the shaft 46 and the surface of the cylindrical bore 24, and abut the bottom edge of the ornament holder 40.

The other end of the spring 60 rests upon a nut-like end cap 70, which screws onto the bottom of the mounting shell 22 on threads 30. Again, an epoxy sealant or glue may be applied to the threads 30 before screwing on the end cap 70 to make this more difficult to remove at a later time.

The spring 60, compressed between end cap 70 and ornament holder 40, biases the ornament mount 40 upward toward inward flange 26.

In a second and a third embodiment of the present invention, alternate means are used to retain spring 60 within the cylindrical bore 24. With reference to FIG. 2a, showing the second embodiment of the present invention, wherein components identical to those shown in FIG. 1 are identified with the previously used reference numerals, the lower end of the spring 60 rests upon a cylindrical disc 80 within cylindrical bore 24. The cylindrical disc 80 is held in position by a retaining pin 82 disposed diametrically across the bottom of the cylindrical portion 28 of the mounting shell 22 in a hole 86 provided thereacross. The retaining pin 82 is kept in position by the nut 32 which holds the hood ornament mount 20 to the body 10 of the motor vehicle.

Figure 2B:
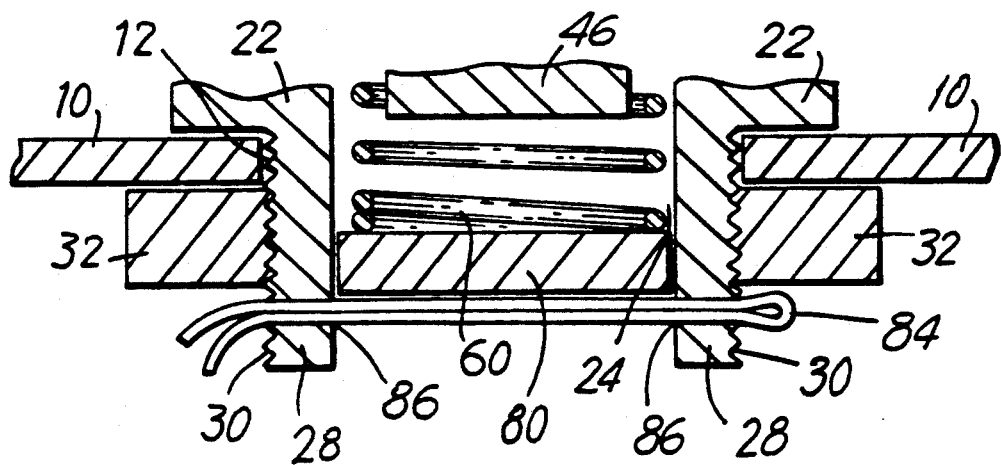
FIG. 2b shows a variation on the second embodiment of the motor vehicle hood ornament mount of the present invention.

A variation of the second embodiment of the present invention is shown in FIG. 2b, wherein the lower end of the spring 60 also rests upon a cylindrical disc 80 within the cylindrical bore 24. The cylindrical disc 80 is held in position by a cotter pin 84 disposed diametrically across the bottom of the mounting shell 22. In this variation the mounting shell 22 is first attached to the body 10 of the motor vehicle by tightening nut 32 thereon. The ornament holder 40, shaft 46, spring 60, and cylindrical disc 80 are then inserted into the cylindrical bore 24 to be held therein by cotter pin 84.

Turning now to FIG. 3, showing a third embodiment of the present invention, and wherein components identical to those shown in earlier figures are again identified with previously used reference numerals, the lower end of the spring 60 rests upon a bolt 90 secured within cylindrical bore 24 on threads 92.

Figure 4:
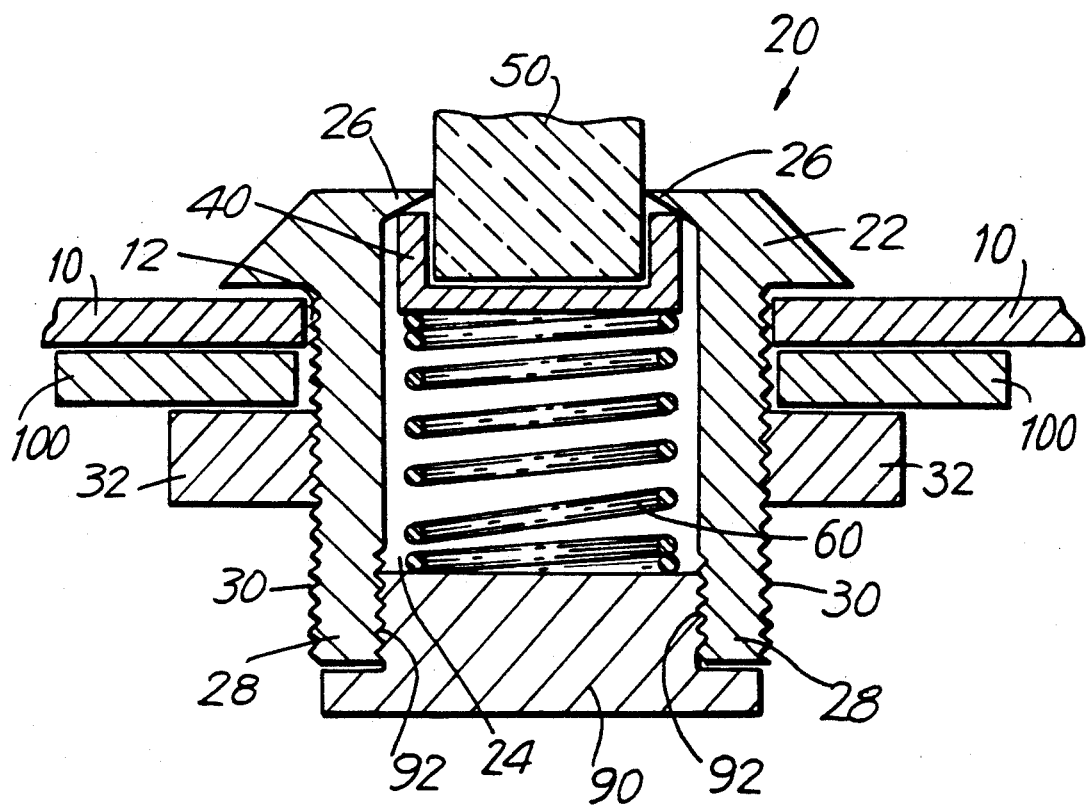
FIG. 4 is a cross-sectional view of a fourth embodiment of the present invention.

Turning finally to FIG. 4, showing a fourth embodiment of the present invention, and wherein components identical to those shown in earlier figures are again identified with previously used reference numerals, the lower end of the spring 60 again rests upon a bolt 90 secured within cylindrical bore 24 on threads 92. It will be observed, however, that the mounting shell 22 is depicted as being of a more tapered design than that previously shown. The mounting shell 22 is further shown as being more flush with the body 10 on the motor vehicle. It is to be understood that the shapes of the components of the present invention may be varied without bringing the product motor vehicle hood ornament mount so formed beyond the scope of the appended claims.

It will further be observed that, in the embodiment shown in FIG. 4, the ornament holder 40 is again biased toward the inward flange 26 at the upper end of the cylindrical bore 24 by spring 60. The ornament holder 40 is also shown not to be mounted upon a shaft 46, which may be taken to be an optional component of the present invention. Also optional is washer 100, which is placed around the cylindrical portion 28 of the mounting shell 22, after same has been inserted through hole 12 in the body 10 of the motor vehicle, before nut 32 is used to firmly secure mounting shell 22 to body 10. It should be understood that such a washer 100 may be included in the position shown in FIG. 4 in any embodiment of the present invention.

Preferably, the mounting shell 22 used with the present invention extends approximately one-quarter inch above the surface of the body 10 of the motor vehicle, and is approximately one-half inch wide.

Modifications to the invention described above would be obvious to those skilled in the art, yet would not bring the device so modified beyond the scope of appended claims.

What is claimed is:

1. A motor vehicle hood ornament mount, designed for installation in a hole in the body of a motor vehicle, comprising:

a mounting shell, said mounting shell having a substantially cylindrical bore therethrough, said mounting shell having a substantially inward flange at the upper one of two end of said cylindrical bore said mounting shell further having a lower cylindrical portion for insertion through said hole in said body of said motor vehicle and an upper portion, said lower cylindrical portion having a diameter less that the width dimension of said upper portion;

means for securely attaching said mounting shell to said body of said motor vehicle;

a shaft disposed within said cylindrical bore of said mounting shell, said shaft being axially translatable within said cylindrical bore and having a smaller diameter than said cylindrical bore, said shaft having a first end and a second end, said first end being adjacent to said inward flange of said mounting shell;

an ornament holder attached to said first end of said shaft, said ornament holder having a receptacle in which an ornament may be secured, said ornament holder having substantially the same diameter as said cylindrical bore so that said inward flange of said mounting shell maintains said ornament mount therewithin;

means for attaching said ornament mount to said shaft; and means for biasing said shaft and ornament holder toward said inward flange of said mounting shell.

2. A motor vehicle hood ornament mount as claimed in claim 1 wherein said means for securely attaching said mounting shell to said body of said motor vehicle comprises:

a threaded lower cylindrical portion of said mounting shell; and a nut, said nut having threads corresponding to said threaded lower cylindrical portion of said mounting shell, so that said nut may be secured thereto.

3. A motor vehicle hood ornament mount as claimed n claim 2 further comprising a washer, said washer being placed about said threaded lower cylindrical portion of said mounting shell before said nut is secured thereto.

4. A motor vehicle hood ornament mount as claimed in claim 1 wherein said means for attaching said ornament mount to said shaft is a screw.

5. A motor vehicle hood ornament mount as claimed in claim 1 wherein said means for biasing said shaft and ornament holder toward said inward flange of said mounting shell comprises:

a biasing spring disposed coaxially about said shaft, said biasing spring having a first end in contact with said ornament holder and a second end; and an end cap secured to said lower cylindrical portion of said mounting shell, said end cap being in contact with said second end of said biasing spring, so that said biasing spring will be compressed between said ornament holder and said end cap.

6. A motor vehicle hood ornament mount as claimed in claim 1 wherein said means for biasing said shaft and ornament holder toward said inward flange of said mounting shell comprises:

a biasing spring disposed coaxially about said shaft, said biasing spring having a first end in contact with said ornament holder and a second end;

a cylindrical disc disposed within said cylindrical bore, said cylindrical disc being in contact with said second end of said biasing spring; and a retaining pin disposed diametrically across said lower cylindrical portion of said mounting shell, said retaining pin holding said cylindrical disc against said second end of said biasing spring, so that said biasing spring will be compressed between said ornament holder and said cylindrical disc, said retaining pin further fixed in position by said means for securely attaching said mounting shell to said body of said motor vehicle.

7. A motor vehicle hood ornament mount as claimed in claim 1 wherein said means for biasing said shaft and ornament holder toward said inward flange of said mounting shell comprises:

a biasing spring disposed coaxially about said shaft, said biasing spring having a first end in contact with said ornament holder and a second end;

a cylindrical disc disposed within said cylindrical bore, said cylindrical disc being in contact with said second end of said biasing spring; and a cotter pin disposed diametrically across said lower cylindrical portion of said mounting shell, said cotter pin holding said cylindrical disc against said second end of said biasing spring, so that said biasing spring will be compressed between said ornament holder and said cylindrical disc.

8. A motor vehicle hood ornament mount as claimed in claim 1 wherein said means for biasing said shaft and ornament holder toward said inward flange of said mounting shell comprises:

a biasing spring disposed coaxially about said shaft, said biasing spring having a first end in contact with said ornament holder and a second end;

a threaded portion of said cylindrical bore; and a bolt, said bolt having threads corresponding to said threaded portion of said cylindrical bore so that said bolt may be secured thereinto, said bolt being in contact with said second end of said biasing spring, so that said biasing spring will be compressed between said ornament holder and said bolt.

9. A motor vehicle hood ornament mount, designed for installation in a hole in the body of a motor vehicle, comprising:

a mounting shell, said mounting shell having a substantially cylindrical bore therethrough, said mounting shell having a substantially inward flange at the upper one of two end of said cylindrical bore, said mounting shell further having a lower cylindrical portion for insertion through said hole in said body of said motor vehicle and an upper portion, said lower cylindrical portion having a diameter less that the width dimension of said upper portion;

means for securely attaching said mounting shell to said body of said motor vehicle;

an ornament holder disposed within said cylindrical bore, said ornament holder having a receptacle in which an ornament may be secured, said ornament holder having substantially the same diameter as said cylindrical bore so that said inward flange of said mounting shell maintains said ornament mount therewithin; and means for biasing said ornament holder toward said inward flange of said mounting shell.

10. A motor vehicle hood ornament mount as claimed in claim 9 wherein said means for securely attaching said mounting shell to said body of said motor vehicle comprises:

a threaded lower cylindrical portion of said mounting shell; and a nut, said nut having threads corresponding to said threaded lower cylindrical portion of said mounting shell, so that said nut may be secured thereto.

11. A motor vehicle hood ornament mount as claimed in claim 10 further comprising a washer, said washer being placed about said threaded lower cylindrical portion of said mounting shell before said nut is secured thereto.

12. A motor vehicle hood ornament mount as claimed in claim 9 wherein said means for biasing said ornament holder toward said inward flange of said mounting shell comprises:

a biasing spring disposed within said cylindrical bore, said biasing spring having a first end in contact with said ornament holder and a second end; and an end cap secured to said lower cylindrical portion of said mounting shell, said end cap being in contact with said second end of said biasing spring, so that said biasing spring will be compressed between said ornament holder and said end cap.

13. A motor vehicle hood ornament mount as claimed in claim 9 wherein said means for biasing said ornament holder toward said inward flange of said mounting shell comprises:
- a biasing spring disposed within said cylindrical bore, said biasing spring having a first end in contact with said ornament holder and a second end;
- a cylindrical disc disposed within said cylindrical bore, said cylindrical disc being in contact with said second end of said biasing spring; and
- a retaining pin disposed diametrically across said lower cylindrical portion of said mounting shell, said retaining pin holding said cylindrical disc against said second end of said biasing spring, so that said biasing spring will be compressed between said ornament holder and said cylindrical disc, said retaining pin further fixed in position by said means for securely attaching said mounting shell to said body of said motor vehicle.

14. A motor vehicle hood ornament mount as claimed in claim 9 wherein said means for biasing said ornament holder toward said inward flange of said mounting shell comprises:
- a biasing spring disposed within said cylindrical bore, said biasing spring having a first end in contact with said ornament holder and a second end;
- a cylindrical disc disposed within said cylindrical bore, said cylindrical disc being in contact with said second end of said biasing spring; and
- a cotter pin disposed diametrically across said lower cylindrical portion of said mounting shell, said cotter pin holding said cylindrical disc against said second end of said biasing spring, so that said biasing spring will be compressed between said ornament holder and said cylindrical disc.

15. A motor vehicle hood ornament mount as claimed in claim 9 wherein said means for biasing said ornament holder toward said inward flange of said mounting shell comprises:
- a biasing spring disposed within said cylindrical bore, said biasing spring having a first end in contact with said ornament holder and a second end;
- a threaded portion of said cylindrical bore; and
- a bolt, said bolt having threads corresponding to said threaded portion of said cylindrical bore so that said bolt may be secured thereinto, said bolt being in contact with said second end of said biasing spring, so that said biasing spring will be compressed between said ornament holder and said bolt.

* * * * *